July 27, 1965    M. E. CROST    3,197,767
APPARATUS FOR ELECTRONIC TIME COMPRESSION
Filed Jan. 4, 1963

INVENTOR,
MUNSEY E. CROST

BY *Harry M. Saragovitz*

ATTORNEY

United States Patent Office 3,197,767
Patented July 27, 1965

3,197,767
APPARATUS FOR ELECTRONIC TIME COMPRESSION
Munsey E. Crost, Loch Arbour, N.J., assignor to the United States of America as represented by the Secretary of the Army
Filed Jan. 4, 1963, Ser. No. 249,538
9 Claims. (Cl. 343—5)
(Granted under Title 35, U.S. Code (1952), sec. 266)

The invention described herein may be manufactured and used by or for the Government for governmental purposes, without the payment of any royalty thereon.

This invention relates to an electronic time-compression apparatus and more particularly to a device for displaying the position and motion of objects detected by a radar system.

It has been a frequent practice to photograph electronic displays for later study and analysis. When a time-sequential series of such photographs is projected at a rate considerably faster than the rate at which the displays were acquired, it will be noted that the increased motion of the targets through the clutter enhances their detectability to a marked degree. Paths of targets may be followed through areas of dense clutter where they might otherwise be completely lost in a real-time display, even with long-persistence phosphors.

While such systems are effective, they are unsuitable for displays in which the present positions and directions of motion of moving targets are to be viewed immediately. There will always be a delay for processing the photographic film after the display is recorded. Since a display of the immediate position of a target is necessary in air-traffic-control systems, early-warning systems, and the like, an apparatus which could display the position and motion of targets simultaneously with the detection of these targets by the radar system would, therefore, be desirable.

It is, therefore, an object of the present invention to provide a means for the immediate display of the past and present positions of objects by the successive display of several previous-history images of the object at a rate which is considerably faster than the rate at which the images were acquired, and wherein the most recent image may be displayed instantaneously with the acquisition of that image.

Many advantages and other objects will appear from the following detailed description, wherein a preferred embodiment is disclosed, and wherein.

Figure 1:
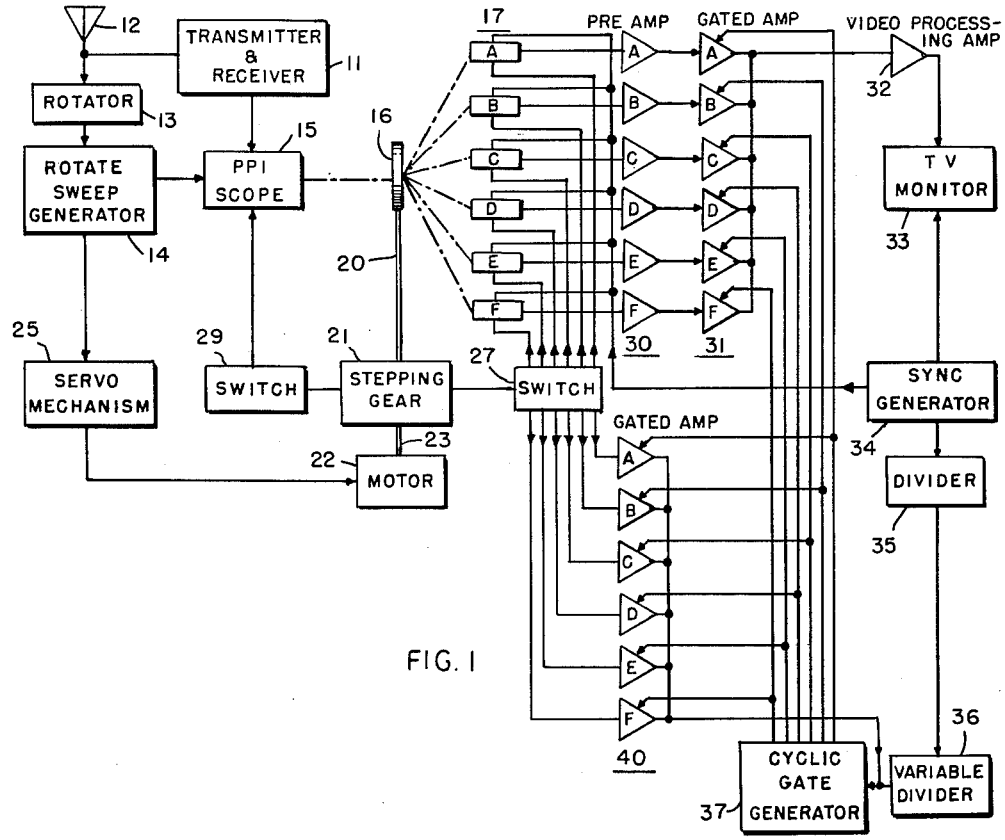
FIG. 1 is a block diagram of a preferred embodiment of the present invention.

Referring now to FIG. 1, there is shown a radar system having the conventional transmitter and receiver 11 coupled to a rotating antenna 12. A rotator 13 rotates the antenna 12, usually at a constant speed, and provides an input for a rotating-sweep generator 14. A plan-position-indicator oscilloscope 15 is coupled to the radar for the presentation of the instantaneous positions of objects detected by the radar. The manner in which this is accomplished is well known to those skilled in the art and will not be described here. The oscilloscope 15, however, is provided with a relatively short-persistence phosphor for a purpose which will be later described.

Figure 2:
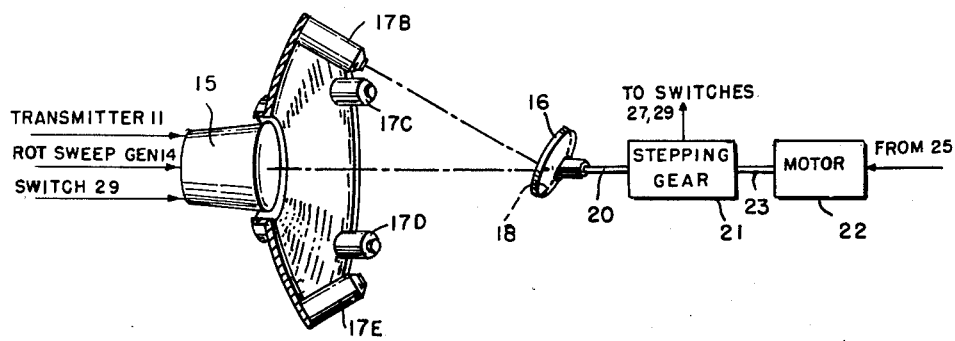
FIG. 2 is a schematic representation of the optical link shown in FIG. 1.

The information on the oscilloscope 15 is reflected sequentially to each of a series of storage tubes 17 by a mirror 16. Storage tubes 17 may be mounted in an array surrounding the oscilloscope 15, as shown in FIG. 2. Mirror 16 has an inclined surface 18 and is mounted coaxially with the oscilloscope 15. Tubes 17 and mirror 16 are mounted in a manner such that images produced on the oscilloscope 15 will be reflected to the respective tubes 17 depending on the angular orientation of the mirror 16.

Tubes 17 are of a modified vidicon type, in which a charge-density pattern is formed by photoconduction and stored on the surface of the photoconductor, which is scanned by an electron beam of low-velocity electrons to provide an electronic output representation of the stored information. The Permachon storage vidicon is an example of such a storage tube. These tubes are well known in the art, and a detailed description of the tubes will not be necessary.

Mirror 16 is periodically rotated through a fraction of a revolution by a shaft 20 connected to a stepping gear 21, which, in turn, is rotated by a motor 22 through a shaft 23. The rotation ratios between the antenna 12, motor 22, and mirror 16 will be such that, after a 360° rotation of antenna 12, mirror 16 is rotated to its next position, where it will remain stationary for another 360° rotation of antenna 12. In the situation shown, i.e., six evenly spaced storage tubes, mirror 16 will be stepped through an angle of 60° after each 360° rotation of antenna 12. Of course, since antenna 12 is continuously rotating, antenna 12 will have moved through some finite angle in the time it takes mirror 16 to be stepped from one position to the next. The duration of the stepping period is made as short as possible, consistent with mechanical limitations and operational requirements of the storage tubes, as described below, but, in any event, the relationship of the mirror's rotational period to the antenna's rotational period is adjusted such that each storage tube is presented with a complete antenna-rotation PPI image before the next stepping action occurs. Two switching assemblies 27 and 29 are operated by outputs from the stepping gear 21.

The outputs from the storage tubes 17 are each connected to a preamplifier 30, each of which provides an input to a gated amplifier 31. The outputs of the gated amplifiers 31 are connected in common and fed to a video-processing amplifier 32 and finally to a TV monitor 33. Gated inputs to amplifiers 31 are derived from the vertical-drive output of the sync-generator 34, as processed by frame-divider 35, variable divider 36, and a cyclic-gate generator 37. Sync-generator 34 provides the scanning frequencies for the TV monitor 33 and the storage tubes 17A through 17F.

A second array of gated amplifiers 40 is provided with inputs from switch 27 and gated inputs from the cyclic-gate generator 37. The outputs of amplifiers 40 are connected in common to the input of the cyclic-gate generator 37.

The operation of the device will now be described. A complete cycle of radar information, which consists of information received during a 360° rotation of antenna 12, is fed to each of the storage tubes 17 in sequence. This is accomplished by orienting mirror 16 such that the lighted images on oscilloscope 15 will be reflected by surface 18 to a particular storage tube 17, as shown in FIG. 2, where storage tube 17–B is exposed while mirror 16 is reflecting information into this particular storage tube. This situation is maintained for one complete 360° circular scan of the oscilloscope 15. A short persistence phosphor on oscilloscope 15 is required to prevent unequal exposure of successive storage areas in tube 17–B while the tube is recording a cycle of information, and to prevent smearing of the image when the mirror is rotated. The sensitive surfaces of all other storage tubes are obscured by a shutter (not shown) rotating with the mirror 16.

After a complete cycle of information is stored in tube 17–B, shaft 20 is rotated by stepping gear 21 to rotate mirror 16 to the next position, so that the next cycle of information may be reflected into tube 17–C which is then exposed. However, prior to the recording of information in tube 17–C, old information which may be stored in this tube is erased by operation of switch 27. Erasure of an image in a Permachon tube is accomplished by flashing a light in front of the tube. Switch 27 in this case may close the particular circuit associated with the tube to be erased, permitting a condenser to discharge through the erasure light (not shown). This action occurs just after the stepping rotation commences. Since a finite time is required for the tube to recover its sensitivity after the flash and for the mirror 16 to rotate, no recording can take place for this period. To prevent blurring of the information recorded in tube 17–B while the mirror is moving, the video input to oscilloscope 15 is turned off just before mirror 16 starts to move by operation of switch 29. The oscilloscope 15 remains off until the mirror 16 stops in the next position.

The above procedure is continuous, thereby providing each of the storage tubes 17–A through 17–F with one complete cycle of radar information, with the tube having just finished recording containing the most recent information. This information, which has been recorded at the real-time rate, is continuously read out of the storage tubes sequentially at a more rapid rate. Storage tubes 17–A through 17–F are continuously feeding information to the gated amplifiers 31 through preamplifiers 31 are sequentially turned on and off for integral numbers of TV frame-periods, at a rate determined by the output pulse frequency of divider 36, to provide a video input to the TV monitor 33. Sync-generator 34, which provides reference frequencies for the scanning of the TV monitor 33 and the storage tubes 17 has a vertical-drive output pulse frequency of 60 p.p.s., while one complete picture on the TV monitor or the storage tubes consists of two cycles or fields. In this case divider 35 will reduce the sync signal to a frequency of 30 p.p.s., so that the amplifiers will be gated on for at least one complete frame of the TV signal. Variable divider 36 may reduce this frequency even further if desired. Cyclic gate generator 37 will then sequentially provide gated inputs to amplifiers 31 at the frequency of the input signal to generator 37 from divider 36.

It can therefore be seen that successive pictures displayed on oscilloscope 15, which are recorded in tubes 17, will be fed to amplifiers 31, which are rapidly gated on and off sequentially to provide a video input to monitor 33 which will display a series of pictures (six, in the case shown) having targets in the form of "blips" progressing in the direction the target is moving to essentially the real-time position of the target, and then repeating.

At certain times it will be necessary to skip the video signal from a storage tube 17, if that particular storage tube is being erased at the same time its signal is to be fed to the monitor 33. Switch 27, which is operated to erase the respective storage tubes 17, includes another section that will also provide an input to a gated amplifier 40 just before its corresponding storage tube 17 is to be erased. If a particular gated amplifier 40 should have a signal input as a result of the closing of switch 27 and is simultaneously turned on by the presence of a pulse being fed by the cyclic-gate generator 37 to the corresponding amplifier 31, an output will be provided from this amplifier 40 which will provide an additional pulse to the input of cyclic-gate generator 37, which will then advance the gate to the next amplifier 31, thereby skipping the amplifier 31 associated with the tube being erased. For example, if the switch in assembly 27 that is associated with amplifier 40–C is closed, and if cyclic-gate generator 37 is simultaneously providing amplifier 31–C with an "ON" signal, an output pulse from amplifier 40–C will be fed to the input of generator 37. Cyclic-gate generator 37, upon receiving this additional pulse, will respond to it in the same manner as it would respond to a pulse from variable divider 36, thereby advancing its output gate to the next amplifier 31–D. In this way the readout of amplifier 31–C is skipped during its erase cycle.

This display of several past-history images, along with enhancing the detectability of moving objects through clutter, will also display the directions of motion of the objects and some of the maneuvers which the objects may perform, such as turns and the like. Furthermore, since the antenna 12 is rotating constantly, the spacing between the several images will be an indication of the horizontal velocity of the object.

Since certain changes may be made in the above apparatus and process without departing from the scope of the invention herein involved, it is intended that all matter contained in the above description or shown in the accompanying drawing shall be interpreted as illustration and not in a limiting sense.

What is claimed is:

1. An electronic time-compression apparatus for displaying the position and motion of phenomena in a field of view; comprising radar means having an antenna rotating at a first time rate and an oscilloscope having a circular sweep rotating at said first time rate; a plurality of storage tubes responsive to the display on said oscilloscope; reflecting means for successively reflecting a complete cycle of information displayed on said oscilloscope into each of said storage tubes at a second time rate which approximates said first time rate; a plurality of gated amplifiers each connected to the output of a storage tube and the outputs of said gated amplifiers connected in common to the input of a display means; and a cyclic gate generator means having a plurality of outputs each connected to one of said gated amplifiers for supplying gating signals successively to said amplifiers at a time rate which is higher than said first time rate.

2. An apparatus for storing successive cycles of information displayed on an oscilloscope; comprising a plurality of storage tubes, responsive to light, mounted in an array surrounding said oscilloscope; a rotatable shaft mounted with its longitudinal axis coincident with the longitudinal axis of said oscilloscope; a mirror angularly disposed on said shaft such that information displayed on said oscilloscope will be reflected into one of said storage tubes depending on the angular orientation of said shaft; and rotating means for rotating said shaft, after one complete cycle of information has been recorded by one of said storage tubes, from a position where said mirror is reflecting information into one storage tube to a position where the next storage tube is exposed to said information.

3. An apparatus as described in claim 2 further including an erasure means associated with each of said storage tubes; and switching means, responsive to said rotating means, for successively energizing each erasure means immediately before its associated storage tube is to store a new cycle of information.

4. An apparatus as described in claim 3 wherein said oscilloscope comprises a short persistence phosphor.

5. An apparatus according to claim 4 and further including means for turning off said oscilloscope while said mirror is rotating.

6. An apparatus for analyzing phenomena present in a field of view; comprising a radar having an antenna rotating at a first time rate and an oscilloscope having short persistence phosphor; said oscilloscope having a circular sweep rotating at said first time rate; a plurality of storage tubes mounted in an array surrounding said oscilloscope; said storage tubes having a photoconductor responsive to the information displayed on said oscilloscope; a rotatable shaft mounted with its longitudinal axis coincident with the longitudinal axis of said oscilloscope; a mirror angularly disposed on said shaft such that information displayed on said oscilloscope will be reflected into one of said storage tubes depending on the angular orientation of said shaft; rotating means for rotating said shaft, after one complete cycle of information has been recorded by one of said storage tubes, from a position where said mirror is reflecting information into one storage tube to a position where the next storage tube is exposed to said information; the output of each said storage tubes connected to the input of one of a plurality of gated amplifiers, the outputs of said gated amplifiers each connected in common to the input of a display means; and a cyclic gate generator means connected to each of said gated amplifiers for supplying gating signals successively to said amplifiers at a time rate which is higher than said first time rate.

7. An apparatus as described in claim 6 further including an erasure means associated with each of said storage tubes; and switching means, responsive to said rotating means, for successively energizing each erasure means immediately before its associated storage tube is to store a new cycle of information.

8. An apparatus as described in claim 7 and further including means for turning off said oscilloscope while said mirror is rotating.

9. An apparatus according to claim 8 and further comprising means for determining the coincidence of an erasure pulse at a storage tube and a gated pulse at a corresponding amplifier to provide an output which will temporarily increase the second time rate whereby the erasure cycle is prevented from being displayed on said display means.

References Cited by the Examiner

UNITED STATES PATENTS

| | | | |
|---|---|---|---|
| 3,044,045 | 7/62 | Kemp | 343—17.1 |
| 3,081,457 | 3/63 | Di Toro | 343—100 |
| 3,153,785 | 10/64 | Lehmann et al. | 343—5 |

FOREIGN PATENTS

| | | |
|---|---|---|
| 1,220,305 | 5/60 | France. |
| 882,905 | 11/61 | Great Britain. |

CHESTER L. JUSTUS, *Primary Examiner.*